Dec. 27, 1966   J. O. TJEBBEN   3,295,025
MOVABLE BARRIER SERVING AS SHUTTER MEANS AND ENCLOSURE
DOOR IN SWITCHGEAR HOUSING
Filed Dec. 31, 1964
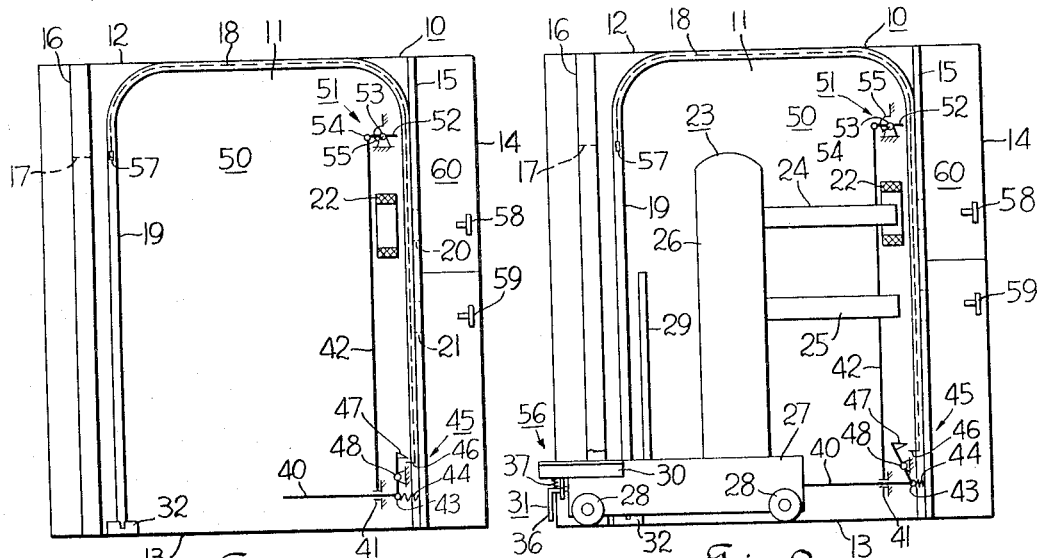
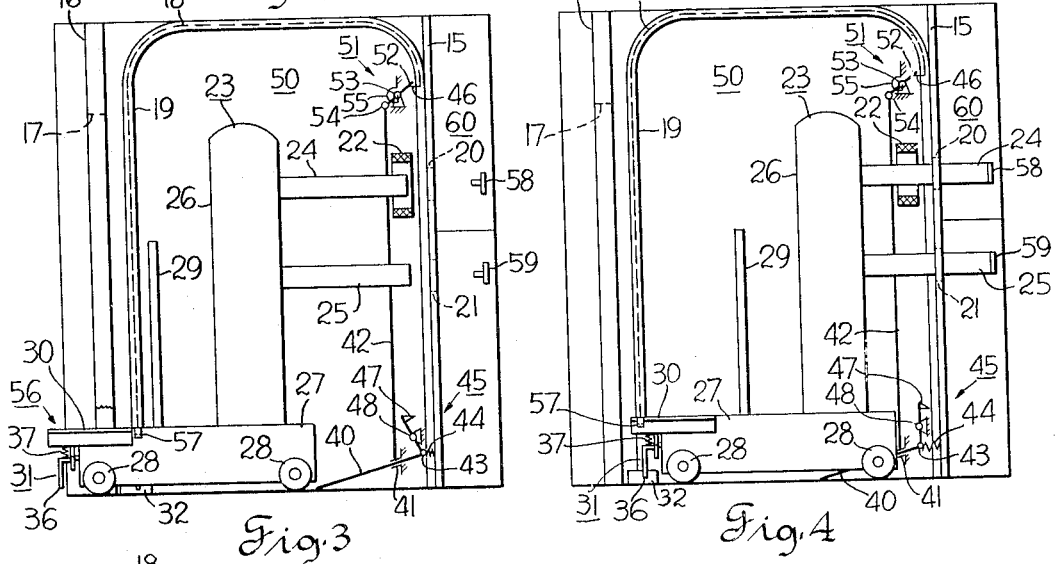
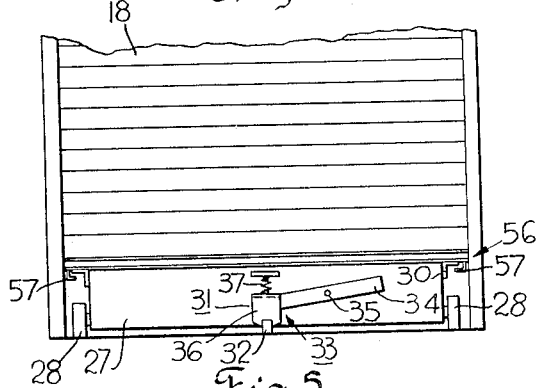
Inventor
John O. Tjebben
By R. J. Falkowski
Attorney

United States Patent Office 3,295,025
Patented Dec. 27, 1966

3,295,025
MOVABLE BARRIER SERVING AS SHUTTER MEANS AND ENCLOSURE DOOR IN SWITCHGEAR HOUSING
John O. Tjebben, Milwaukee, Wis., assignor to Allis-Chalmers Manufacturing Company, Milwaukee, Wis.
Filed Dec. 31, 1964, Ser. No. 422,861
12 Claims. (Cl. 317—103)

This invention relates to switchgear cubicles or enclosures, particularly to enclosures that provide a movable barrier for isolating the high voltage compartment from the electrical apparatus compartment and for preventing access to the electrical apparatus compartment when the high voltage and electrical apparatus compartments are not isolated from each other.

The goals of cubicle design for switchgear include the prevention of access to the high voltage compartment upon inserting or withdrawing of the switchgear from the cubicle. This is often accomplished by the provision of safety interlocks that are not easily defeated. This invention accomplishes these goals with a high degree of effectiveness with a relatively simple, small and inexpensive system.

The objects of this invention are to provide a new and improved switchgear enclosure; to provide a switchgear enclosure with a single barrier door that performs the function of isolating the switchgear enclosure from both the high voltage compartment and the exterior of the enclosure; to provide a switchgear enclosure that prevents unsafe access to the high voltage compartment; to provide a switchgear enclosure in which the condition of the isolating barrier is always visible; to provide a switchgear enclosure that greatly reduces the possibility of accidental electrical shock; to provide a switchgear enclosure that is relatively inexpensive; to provide a switchgear enclosure of a relatively smaller size; and to provide a switchgear enclosure that enables maintenance to be conducted on equipment in the switchgear compartment while still maintaining isolation of the switchgear compartment from the high voltage compartment.

FIG. 1 is a simplified side view of a switchgear enclosure according to this invention having the facing sidewall removed;

FIG. 2 is a similar view of the switchgear enclosure showing a stage of insertion of a circuit breaker with the barrier door at the open position;

FIG. 3 shows the circuit breaker in the same position as in FIG. 2 with the barrier door at the closed position;

FIG. 4 shows the circuit breaker in the fully inserted contact making position; and FIG. 5 shows a front view of a portion of the circuit breaker and enclosure with the barrier door in the closed position.

Referring to FIG. 1, an electrical apparatus or switchgear enclosure 10 comprises a sidewall 11, top wall 12, a bottom plate 13, a rear wall 14, a dividing wall or barrier 15 that is preferably an insulating barrier that divides the enclosure into a switchgear or apparatus compartment 50 and a high voltage compartment 60, and a front wall 16 having an opening 17 for the insertion of the electrical apparatus. The facing sidewall is removed.

A movable barrier or door 18 (shown schematically) has an overhead sliding door construction with hinged sections. Movable door 18 is mounted to ride on a track 19 mounted on sidewall 11. The track on the facing sidewall is not shown. Dividing wall 15 has connector openings 20 and 21 for receiving the connectors of the electrical apparatus. One of the connectors passes through a current transformer 22 to furnish a measure of current through the connector.

Referring to FIG. 2, electrical apparatus such as a circuit breaker 23 is shown partially inserted into compartment 50 of enclosure 10. The circuit breaker comprises connectors 24 and 25, a breaker pole 26, a base 27, wheels 28, barrier plate 29, and a positioning latch mechanism 31. The positioning latch mechanism comprises a track 32 mounted on bottom plate 13 and an engaging pawl mechanism 33 that cooperate to lock the circuit breaker at different positions in the cubicle. FIG. 5 shows the pawl mechanism 33 in more detail as comprising an arm 34 movable about a pivot 35 to raise a pawl 36 against a compression spring 37 to disengage the pawl from the notch of track 32.

The interlock system, shown schematically, comprises blocking means for stopping the insertion of the circuit breaker at a first position as shown in FIGS. 2 and 3, locking means for locking the barrier door in the position shown in FIGS. 1 and 2, means for releasing the locking means upon insertion of the circuit breaker to the position shown in FIGS. 2 and 3; means for releasing the blocking means when the door is moved to the position shown in FIGS. 3, 4 and 5; and means for preventing movement of the door when the circuit breaker is moved beyond the position shown in FIGS. 2 and 3 to the position shown in FIG. 4.

With the circuit breaker in the position shown in FIGS. 2 and 3, sliding door 18 can be moved from the position shown in FIG. 2 to the position shown in FIG. 3, to expose openings 20 and 21. The length of door 18 and the height of barrier plate 29 are selected so that access opening 17 of front wall 16 is closed off by the combination of door 18 and barrier plate 29 when any part of openings 20 or 21 are exposed.

Referring to FIGS. 2 and 3, the blocking means is shown as comprising a blocking rod 40 held in position by a sleeve 41 connected to a connecting rod 42. Blocking rod 40 is movable about and mounted on a hinge 43, and is biased to the position shown in FIGS. 1 and 4 by any known means such as a compression spring 44.

Referring to FIG. 2, the locking means is shown as comprising a barrier door interlock mechanism 45 that comprises a lip 46 mounted on door 18, as shown, and a catch 47 for engaging lip 46. Catch 47 is rotatable about a pivot 48 and is biased in the locking position by a compression spring 44.

The means responsive to the placing of the circuit breaker at the first position for releasing the locking means is shown as comprising the blocking rod connected to catch 47 through a hinge 43. Catch 47 is rotated through hinge 43 about pivot 48 upon movement of blocking rod 40 in response to the insertion of the circuit breaker.

Upon the release of interlock mechanism 45 by the insertion of the circuit breaker, barrier door 18 may be moved from its open position, as shown in FIG. 2, to its closed position, as shown in FIGS. 3, 4 and 5.

Movement of barrier door 18 to the closed position releases the circuit breaker for further movement into the enclosure. The means for releasing the circuit breaker defeats the blocking means and may be a releasing mechanism 51 (FIG. 3) that comprises a trip lever 52 rotatable about a pivot 53 and connected at a hinge 54 to connecting rod 42. Upon movement of barrier door 18, lip 46 engages trip lever 52 forcing connecting rod 42 downward against a biasing means such as a leaf spring 55 to move blocking rod 40 downward through sleeve 41 to the position shown in FIG. 3, where it frees the circuit breaker for further insertion.

The means for preventing movement of door 18 and maintaining the door in the closed position when door 18 has been moved to its full closed position and the circuit breaker has been inserted beyond its first position, is shown as a door latching means 56. Referring specifically to FIG. 5, door latching means 56 comprises a lip 57 mounted on barrier door 18 and door latching track 30 mounted on the circuit breaker. Upon insertion of the breaker beyond the position shown in FIG. 3 as at the position shown in FIG. 4, track 30 engages lip 57 and prevents opening of barrier door 18.

Upon movement of blocking rod 40 to its lower position, the circuit breaker may be inserted into the enclosure to the position shown in FIG. 4 to engage connectors 24 and 25 with high voltage contacts 58 and 59.

With the circuit breaker in the position shown in FIGS. 2 and 3, the relationship of door 18, openings 20 and 21, and isolation barrier 29 is selected to prevent access to switchgear chamber 50 unless the door is open beyond the top of isolation barrier 29, in which case barrier door 18 completely covers openings 20 and 21. In some applications an isolating barrier such as dividing wall 15 may not be necessary. In this case the open position of door 18 would provide a wall for dividing the enclosure to isolate the high voltage portion.

To remove the circuit breaker, the circuit breaker is moved out from the position shown in FIG. 4 to a position shown in FIG. 3. Barrier door 18 may then be moved from the position shown in FIG. 3, to the position shown in FIG. 2. When the door is opened sufficiently to allow full removal of the circuit breaker, the circuit breaker is withdrawn and blocking rod 40 is raised by the action of leaf spring 55 to stop reinsertion at the first position of the circuit breaker. Catch 47 is moved by the action of compression spring 44 to engage lip 46 and thereby prevent opening of door 18. The bottom of door 18 is related to the maximum height of the circuit breaker so that the circuit breaker cannot be fully withdrawn unless door 18 is opened far enough to engage lip 46 with catch 47.

In describing the invention, the preferred embodiment has been shown and described, but it is obvious to one skilled in the art that there are many variations, combinations, alterations and modifications that may be made without departing from the spirit of the invention, or from the scope of the appended claims.

The embodiments of the invention in which an exclusive property or privilege is claimed are defined as follows:

1. An enclosure having an access opening for receiving an electrical apparatus having a connector, said enclosure comprising:
   a high voltage contact located to contact the connector upon insertion of the electrical apparatus into the enclosure a first predetermined distance,
   movable barrier means for uncovering the access opening and isolating the high voltage contacts in a compartment when in one position and for covering the access opening and exposing the high voltage contacts for receiving the connectors when in another position;
   interlocking means for preventing movement of the barrier means from the one position without insertion of the electrical apparatus a second predetermined distance less than the first predetermined distance, and door latching means for preventing movement of the barrier means from the other position when said electrical apparatus is inserted into the enclosure beyond said second predetermined distance.

2. An enclosure having an access opening for receiving an electrical apparatus having a connector, said enclosure comprising:
   a high voltage contact located to contact the connector upon insertion of the electrical apparatus into the enclosure a first predetermined distance,
   barrier means comprising a sliding hinged door mounted on a track and movable along said track from a first position that uncovers the access opening and isolates the high voltage contacts in an enclosed compartment to a second position that covers the access opening and exposes the high voltage contacts for receiving the connector; and
   interlocking means for preventing movement of the door from the first position without insertion of the electrical apparatus a second predetermined distance less than the first predetermined distance, and door latching means for preventing movement of the door from the closed position when said electrical apparatus is inserted into the enclosure beyond said second predetermined distance.

3. An enclosure having an access opening for receiving an electrical apparatus having connectors, said enclosure comprising:
   high voltage contacts located to contact the connectors of the electrical apparatus upon full insertion of the electrical apparatus into the enclosure;
   movable barrier means for isolating the high voltage contacts in an enclosed compartment and uncovering the access opening when in one position and for covering the access opening and exposing the high voltage contacts for receiving the connectors when in another position;
   blocking means for stopping the insertion of the electrical apparatus at a first position;
   locking means for locking the barrier means in the one position;
   means responsive to the insertion of the electrical apparatus to the first position for releasing the locking means to allow movement of the barrier means;
   means responsive to movement of the barrier means to the other position for releasing the blocking means to permit further insertion of the electrical apparatus; and
   means for preventing movement of the barrier means when the barrier means is in the other position and the electrical apparatus has been inserted into the enclosure beyond the first position.

4. An enclosure having an access opening for receiving an electrical apparatus having connectors, said enclosure comprising:
   high voltage contacts located to make contact with the connectors upon full insertion of the electrical apparatus into the enclosure;
   movable barrier means for uncovering the access opening and isolating the high voltage contacts in an enclosed compartment when in one position and for covering the access opening and exposing the high voltage contacts for receiving the connectors when in another position;
   blocking means for stopping the insertion of the electrical apparatus at a first position;
   locking means for locking the barrier means in the one position;
   means responsive to the positioning of the electrical apparatus at the first position for releasing the locking means to allow movement of the barrier means;
   means responsive to the positioning of the barrier means in the other position for releasing the blocking means to permit further insertion of the electrical apparatus; and
   means for preventing movement of the barrier means when the barrier means is in the other position and the connectors of the electrical apparatus are in contact with the high voltage contacts.

5. An enclosure having an access opening for receiving an electrical apparatus having connectors, said enclosure comprising:
   high voltage contacts located to make contact with the connectors upon full insertion of the circuit breaker;
   barrier means comprising a sliding hinged door mounted on a track and movable along said track from an open position that uncovers the access opening and isolates the high voltage contacts in an enclosed compartment to a closed position that covers the access opening and exposes the high voltage contacts for receiving the connectors;

blocking means for stopping the insertion of the electrical apparatus at a first position;

locking means for locking the barrier door in its open position;

means responsive to the insertion of the circuit breaker to the first position for releasing the locking means to allow movement of the barrier door;

means responsive to movement of the barrier door to the closed position for releasing the blocking means to permit complete insertion of the electrical apparatus; and means for preventing movement of the barrier door when the barrier door is in the closed position and the electrical apparatus is inserted beyond the first position.

6. An enclosure having an access opening for receiving an electrical apparatus having connectors, said enclosure comprising:

a dividing insulating wall located to divide the enclosure into an electrical apparatus compartment and a high voltage compartment having high voltage contacts, said dividing wall having openings for receiving the connectors to contact the high voltage contacts upon insertion of the electrical apparatus into the enclosure a first predetermined distance, movable barrier means for uncovering the access opening and covering the dividing wall openings when in one position and for covering the access opening and exposing the dividing wall openings when in another position; and interlocking means for preventing movement of the barrier from the one position without insertion of the electrical apparatus a second predetermined distance less than the first predetermined distance and door latching means for preventing movement of the barrier means from the other position when said electrical apparatus is inserted into the enclosure beyond said second predetermined distance.

7. An enclosure having an access opening for receiving an electrical apparatus having connectors, said enclosure comprising:

a dividing insulating wall located to divide the enclosure into an electrical apparatus compartment and a high voltage compartment having high voltage contacts, said dividing wall having openings for receiving the connectors to contact the high voltage contacts upon insertion of the electrical apparatus into the enclosure a first predetermined distance, barrier means comprising a sliding hinged door mounted on a track and movable along said track from an open position that uncovers the access opening and covers the dividing wall openings to a closed position that covers the access opening and uncovers the dividing wall openings; and interlocking means for preventing movement of the door from the open position without insertion of the electrical apparatus a second predetermined distance less than the first predetermined distance, and door latching means for preventing movement of the door from the closed position when said electrical apparatus is inserted into the enclosure beyond said second predetermined distance.

8. An enclosure having an access opening for receiving an electrical apparatus having connectors, said enclosure comprising:

a dividing insulating wall located to divide the enclosure into an electrical apparatus compartment and a high voltage compartment having high voltage contacts, said dividing wall having openings for receiving the connectors to contact said high voltage contacts upon full insertion of the electrical apparatus;

barrier means movable from one position that substantially covers the openings in the dividing wall and uncovers the access opening to another position that substantially covers the access opening and uncovers the openings in the dividing wall, said barrier means covering the access opening when any part of the openings in the dividing wall are exposed by movement of the barrier means from said other position;

blocking means for stopping the insertion of the electrical apparatus at a first position;

locking means for locking the barrier means in the one position;

means responsive to the insertion of the electrical apparatus to the first position to release the locking means to allow movement of the barrier means from the one position;

means responsive to the movement of the barrier means to the other position for releasing the blocking means to permit further insertion of the electrical apparatus; and means for preventing movement of the barrier means when said barrier means is in the other position and the electrical apparatus is inserted beyond the first position.

9. An enclosure having an access opening for receiving a circuit breaker or similar apparatus having connectors, said enclosure comprising:

a dividing insulating wall located to divide the enclosure into a circuit breaker compartment and a high voltage compartment having high voltage contacts, said dividing wall having openings for receiving the connectors to contact said high voltage contacts upon full insertion of the circuit breaker;

means for covering part of the access opening when the circuit breaker is inserted in the enclosure;

a sliding hinged barrier door mounted on a track to be movable from an open position that substantially covers the openings in the dividing wall and uncovers the access opening to a closed position that covers the access opening and uncovers the dividing wall to expose the dividing wall openings;

blocking means for stopping the insertion of the circuit breaker at a first position;

locking means for locking the barrier door in its open position;

means responsive to the insertion of the circuit breaker to the first position for releasing the locking means to allow movement of the barrier door;

means responsive to placement of the barrier door in the closed position for releasing the blocking means to permit further insertion of the circuit breaker; and means for preventing movement of the barrier door when said barrier door is in the closed position and the circuit breaker is inserted beyond the first position.

10. An enclosure having an access opening for receiving a circuit breaker or similar apparatus having connectors, said enclosure comprising:

a dividing insulating wall located to divide the enclosure into a circuit breaker compartment and a high voltage compartment having high voltage contacts, said dividing wall having openings for receiving the connectors to contact said high voltage contacts upon full insertion of the circuit breaker;

a barrier plate mounted on the circuit breaker to cover part of the access opening when the circuit breaker is inserted in the enclosure;

a sliding hinged barrier door mounted on a track to be movable from an open position that substantially covers the openings in the dividing wall and uncovers the access opening to a closed position that covers the access opening and uncovers the barrier wall to expose the openings, said barrier door and barrier plate covering the access opening when any part of the dividing wall openings are exposed by movement of the barrier door;

blocking means for stopping the insertion of the circuit breaker at a first position;

locking means for locking the barrier door in its open position;

means responsive to the insertion of the circuit breaker to the first position for releasing the locking means to allow movement of the barrier door;

means responsive to placement of the barrier door in the closed position for releasing the blocking means to permit further insertion of the circuit breaker; and means for preventing movement of the barrier door when said barrier door is in the closed position and the circuit breaker is inserted beyond the first position.

11. An enclosure having an access opening for receiving a circuit breaker or similar apparatus having connectors, said enclosure comprising:

a dividing wall located to divide the enclosure into a circuit breaker compartment and a high voltage compartment having high voltage contacts, said dividing wall having openings for receiving the connectors to contact said high voltage contacts upon full insertion of the circuit breaker;

a barrier plate mounted on the circuit breaker to cover part of the access opening upon insertion of the circuit breaker to a first position;

a sliding hinged barrier door mounted on a track to be movable from an open position that covers the openings in the dividing wall and uncovers the access opening to a closed position that covers the access opening and uncovers the openings in the dividing wall, said barrier door and barrier plate covering the access opening when any part of the openings are exposed by movement of the barrier door;

blocking means for stopping the insertion of the circuit breaker at the first position, said first position selected to locate the circuit breaker to allow movement of the barrier door over the barrier plate;

locking means for locking the barrier door in its open position;

means responsive to the insertion of the circuit breaker to the first position to release the locking means to allow movement of the barrier door;

means responsive to movement of the barrier door to the closed position for releasing the blocking means to permit complete insertion of the circuit breaker; and means responsive to insertion of the circuit breaker to a position where the connectors block movement of the barrier door to cover the opening for preventing movement of the barrier door.

12. An enclosure having an access opening for receiving a circuit breaker or similar apparatus having connectors, said enclosure comprising:

a dividing wall located to divide the enclosure into a circuit breaker compartment and a high voltage compartment having high voltage contacts, said dividing wall having openings for receiving the connectors to contact said high voltage contacts upon full insertion of the circuit breaker;

a barrier plate mounted on the circuit breaker to cover part of the access opening upon insertion of the circuit breaker to a first position;

a sliding hinged barrier door mounted on a track to be movable from an open position that covers the openings in the dividing wall and uncovers the access opening to a closed position that covers the access opening and uncovers the openings in the dividing wall, said barrier door and barrier plate covering the access opening when any part of the openings are exposed by movement of the barrier door;

blocking means for stopping the insertion of the circuit breaker at the first position, said first position selected to locate the circuit breaker to allow movement of the barrier door over the barrier plate;

locking means for locking the barrier door in its open position;

means responsive to the insertion of the circuit breaker to the first position to release the locking means to allow movement of the barrier door;

means responsive to movement of the barrier door to the closed position for releasing the blocking means to permit complete insertion of the circuit breaker; and an engaging device mounted on the door and a track mounted on the circuit breaker, said engaging device and track located and adapted in cooperative relationship to prevent movement of the barrier door when said barrier door is in the closed position and the circuit breaker is inserted beyond the first position.

References Cited by the Examiner

UNITED STATES PATENTS

| | | | |
|---|---|---|---|
| 2,790,112 | 4/1957 | Linde | 317—103 |
| 3,002,129 | 9/1961 | Mueller | 317—103 |

ROBERT K. SCHAEFER, *Primary Examiner.*

W. GARVERT, *Assistant Examiner.*